United States Patent
Ducolon et al.

(10) Patent No.: US 8,036,961 B2
(45) Date of Patent: Oct. 11, 2011

(54) DYNAMICALLY MANAGING TIMESHEET DATA ASSOCIATED WITH MULTIPLE BILLING TYPES

(75) Inventors: R. David Ducolon, Auburn, WA (US); Xiaoning Fu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1340 days.

(21) Appl. No.: 11/443,775

(22) Filed: May 31, 2006

(65) Prior Publication Data

US 2007/0282721 A1    Dec. 6, 2007

(51) Int. Cl.
G06F 15/02    (2006.01)
G07C 1/10    (2006.01)

(52) U.S. Cl. .......................................... 705/32
(58) Field of Classification Search .................. 705/32
See application file for complete search history.

(56) References Cited

U.S. PATENT DOCUMENTS

| | | | |
|---|---|---|---|
| 5,696,702 A | 12/1997 | Skinner et al. | |
| 6,092,050 A | 7/2000 | Lungren et al. | |
| 6,735,574 B2 | 5/2004 | Bull | |
| 6,753,884 B1 * | 6/2004 | Finch et al. | 715/762 |
| 7,107,268 B1 * | 9/2006 | Zawadzki et al. | 1/1 |
| 2002/0065796 A1 | 5/2002 | Cohen | |
| 2003/0046135 A1 | 3/2003 | Cartwright et al. | |
| 2003/0107587 A1 | 6/2003 | Maritzen et al. | |
| 2003/0179241 A1 | 9/2003 | Nonaka et al. | |
| 2004/0019542 A1 | 1/2004 | Fuchs et al. | |
| 2006/0010051 A1 | 1/2006 | Sattler et al. | |
| 2006/0026053 A1 | 2/2006 | Dezonno et al. | |
| 2007/0078863 A1 * | 4/2007 | Thompson | 707/100 |
| 2007/0094110 A1 * | 4/2007 | McCrea | 705/32 |

FOREIGN PATENT DOCUMENTS

GB    2386706    9/2003
WO    WO 0244981    6/2006

OTHER PUBLICATIONS

Essex, David E, "Time Travelers", PM Network, Mar. 2006, v. 20, pp. 74-76.*
"NetConsole Timesheet," http://www.netconsoletimesheet.com/Services01.cfm, (Retrieved Mar. 8, 2006).
Atlantic Global: Benefits of Project Planning for Project Managers, http://www.atlantic-ec.com/timesheet-project-managers.html, (Retrieved Mar. 8, 2006). Click Time Web Timesheet, http://www.clicktime.com/products.asp (Retrieved on Mar. 8, 2006).
GHG: Employee Management Suite: The way out of the paper quagmire, http://www.ghg.com/prod-ems.htm, (Retrieved on Mar. 8, 2006).
"Spherical Timesheet Version 3.5 User Guide," http://www.sphericaltech.com/files%5CSTManual.pdf, (2004-2006 spherical Technology Pty Ltd.).

* cited by examiner

Primary Examiner — Matthew Gart
Assistant Examiner — Seye Iwarere
(74) Attorney, Agent, or Firm — Merchant & Gould

(57) ABSTRACT

Methods, systems, and computer program products manage timesheet data associated with multiple billing types. Embodiments of the present invention are unique in that each billing type is visually displayed as a separate database record when in actuality it is simply a pivoted representation of attributes on a single record. A method involves retrieving timesheet data associated with a specific timesheet. Each instance of the timesheet data associated with a date and multiple billing types are stored on a server as a single record. The method also involves pivoting the timesheet data to display as separate records the timesheet data associated with a date and multiple billing types. Each billing type associated with actual time entry is displayed and associated with one of the records as displayed. This combination of data storage and data display represents distinct improvements in levels of efficiency for both a timesheet user and a timesheet manager.

15 Claims, 5 Drawing Sheets

DYNAMICALLY MANAGING TIMESHEET DATA ASSOCIATED WITH MULTIPLE BILLING TYPES

COPYRIGHT NOTICE

A portion of the disclosure of this patent document contains material, which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

BACKGROUND

With the advent of the computer age, computer and software users who work as employees, professionals, and/or business managers have grown accustomed to software applications that help them plan, enter, and account for their time worked with elaborate graphical user interfaces (GUIs). Consequently, time entry users of modern electronic timesheets expect efficient user interface design, whereas business managers expect overt display of all data. Often times a business manager's needs versus the employee timesheet user's needs are at odds when it comes to timesheet application features. Modern electronic timesheet applications allow users to report time worked back to the business. However total time worked can be accounted for and broken down into billable, non-billable, straight time, and/or overtime. Thus, one time worked number assigned to a user can be reported back in as many as four billing types.

This creates interface complications when attempting to provide an efficient interface for time entry users and a comprehensive interface for business managers. Conventional timesheet applications track time on a day-by-day basis and every task can have a separate line. Thus, in a fixed time period, for example a week, a user could expect even a minimum number of tasks over five to seven days to either explode the user interface horizontally and/or vertically beyond a computer screen or require hidden and/or tagged data. Both of these display methods render the interface virtually unusable.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments of the present invention solve the above and other problems by providing for dynamically managing timesheet data associated with multiple billing types. Embodiments of the present invention are unique in that each billing type is visually displayed as a separate database record when in actuality it is simply a pivoted representation of attributes on a single record. In one embodiment, a method involves retrieving timesheet data associated with a specific timesheet. Each instance of the timesheet data associated with a date and multiple billing types are stored on a server as a single record. The method also involves pivoting the timesheet data to display as separate records the timesheet data associated with a date and multiple billing types. Each billing type associated with actual time entry is displayed and associated with one of the records as displayed. This combination of data storage and data display represents distinct improvements in levels of efficiency for both a timesheet user and a timesheet manager.

The multiple billing types are represented as subordinate records in a user interface that timesheet users can choose to display or not depending upon the need of each individual task and/or assignment. This feature streamlines the user experience. In contrast, a business manager is presented with each timesheet for review in a manner that can display all data entered by the user without the need to display extra columns where the data fill is not present. The billing types include straight or regular billable, overtime billable, straight non-billable, and overtime non-billable.

These and other features and advantages will be apparent from a reading of the following detailed description and a review of the associated drawings. It is to be understood that both the foregoing general description and the following detailed description are explanatory only and are not restrictive of the invention as claimed.

BRIEF DESCRIPTION OF THE DRAWINGS

FIG. 2 illustrates a timesheet user interface (UI) rendering a display of a billing type if an actual time entry is present;

FIG. 4 illustrates another timesheet user interface (UI) rendering a display of a billing type according to the user selected common controls of FIG. 3.

DETAILED DESCRIPTION

As briefly described above, embodiments of the present invention are directed to dynamically managing timesheet data associated with multiple billing types. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the invention. The following detailed description is therefore not to be taken in a limiting sense, and the scope of the present invention is defined by the appended claims and their equivalents.

Figure 1:
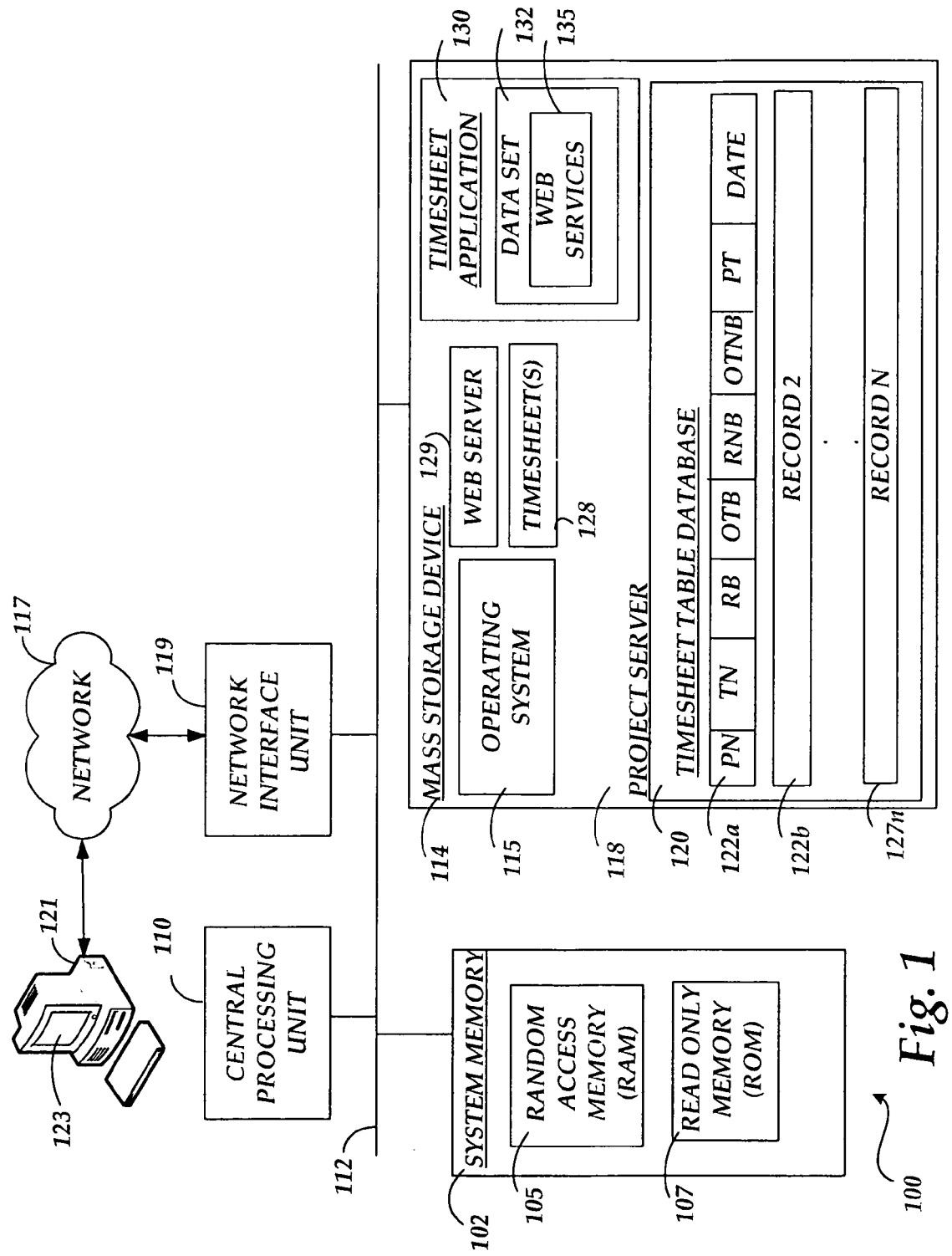
FIG. 1 illustrates an exemplary computing system.

Referring now to the drawings, in which like numerals refer to like elements through the several figures, aspects of the present invention and an exemplary computing operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Embodiments of the invention may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one exemplary system for implementing the invention includes a computing device, such as computing device 100. In a basic configuration, the computing device 100 typically includes at least one processing unit 110, system memory 102, and a mass storage device (MSD) 114. Depending on the exact configuration and type of computing device, the system memory 102 may be volatile (such as RAM 105), non-volatile (such as ROM 107, flash memory, etc.) or some combination of the two. The MSD 114 typically includes an operating system 115 suitable for controlling the operation of a networked server computer. The MSD 114 may also include one or more software applications, such as a timesheet application 130 and a web server application 129 working in conjunction with a project server application 120 and timesheet(s) 128. The project server application 120 may include a SQL® server, such as from Microsoft Corporation. The project server application 120 includes a timesheet table database including individual records 122a-122n.

According to embodiments of the invention, the individual records 122a-122n may comprise a variety of field or data types associated with timesheet data reporting, such as a project name (PN), a task name (TN), a regular billable billing type (RB), an overtime billable billing type (OTB), a regular non-billable (RNB), an overtime non-billable (OTNB), planned time (PT), and a date associated with the timesheet data. According to embodiments of the present invention, the individual records 122a-122n is illustrative of multiple billing types being efficiently stored in association with a date and task within a single record.

The timesheet table database works in conjunction with the timesheet application 130, a dataset 132 derived from the timesheet data records 122, and web services 135 to store timesheet data as a single record yet render the timesheet data in the form of separate records in a timesheet grid on a client computer 121 via a screen display 123.

The MSD 114 is connected to the CPU 110 through a mass storage controller (not shown) connected to the system bus 112. The MSD 114 and its associated computer-readable media, provide non-volatile storage for the computing device 100. Although the description of computer-readable media contained herein refers to a MSD, such as a hard disk or RAID array, it should be appreciated by those skilled in the art that computer-readable media can be any available media that can be accessed by the CPU 110.

The CPU 110 may store data to and access data from the MSD 114. Data is transferred to and received from the MSD 114 through the system bus 112. The CPU 110 may be a general-purpose computer processor. Furthermore, as mentioned below, the CPU 110, in addition to being a general-purpose programmable processor, may be firmware, hard-wired logic, analog circuitry, other special purpose circuitry, or any combination thereof.

According to various embodiments of the invention, the computing device 100 can operate in a networked environment, as shown in FIG. 1, using logical connections to remote computing devices via network communication, such as an Intranet, or a local area network (LAN). The computing device 100 may connect to the network 117 via a network interface unit 119. It should be appreciated that the network interface unit 119 may also be utilized to connect to other types of networks and remote computer systems. A computing device, such as the computing device 100, typically includes at least some form of computer-readable media. Computer readable media can be any available media that can be accessed by the computing device 100. By way of example, are not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, disk drives, a collection of disk drives, flash memory, other memory technology or any other medium that can be used to store the desired information and that can be accessed by the computing device 100.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 2:
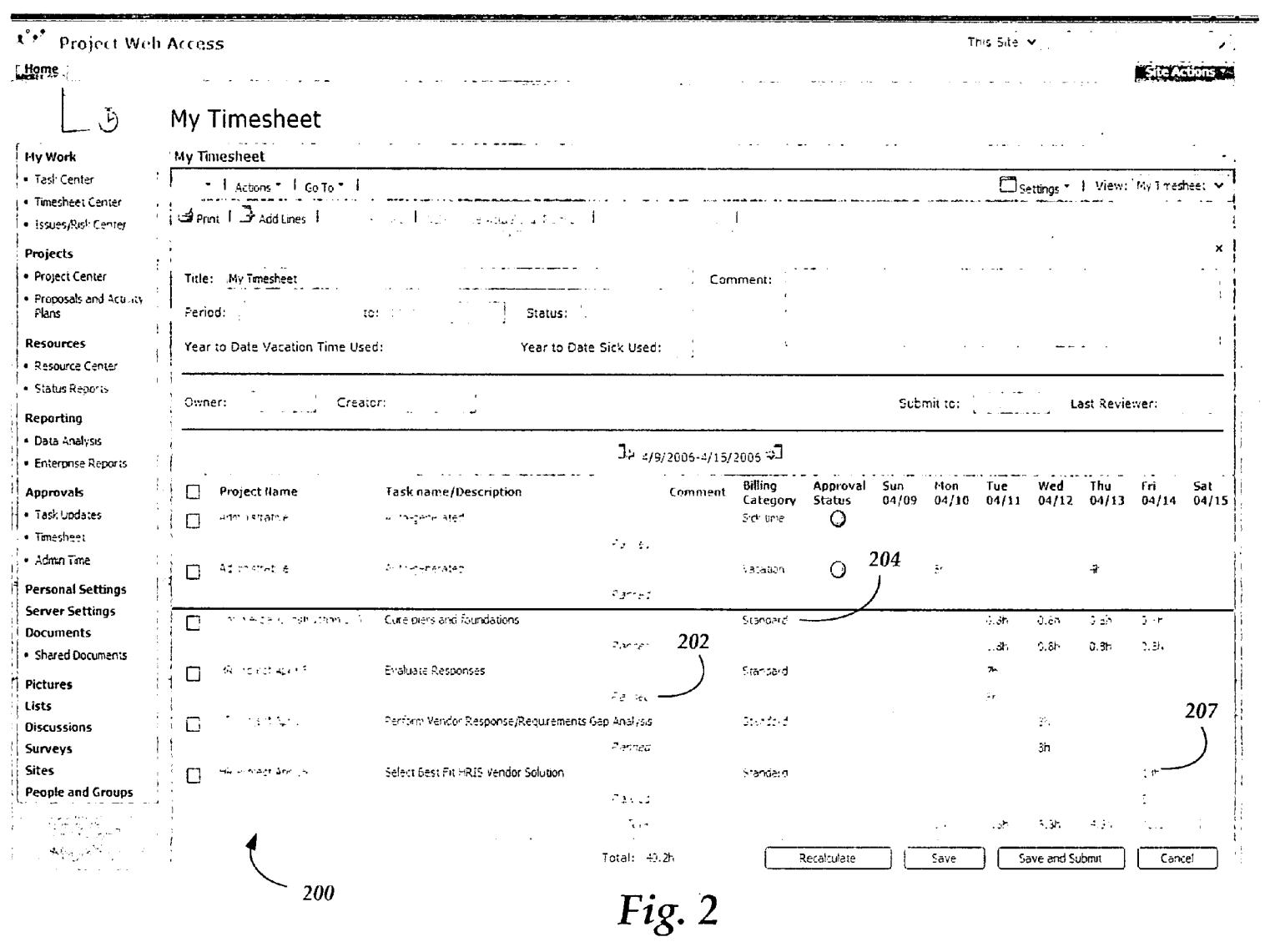

FIG. 2 illustrates a timesheet UI 200 rendering a billing type when an actual time entry is present. The UI 200 includes a record type row display of planned time 202 and regular or standard time billing type 204 because both data types include an actual time entry 207. The UI 200 may be most useful to a business manager who needs to see all entries.

Figure 3:
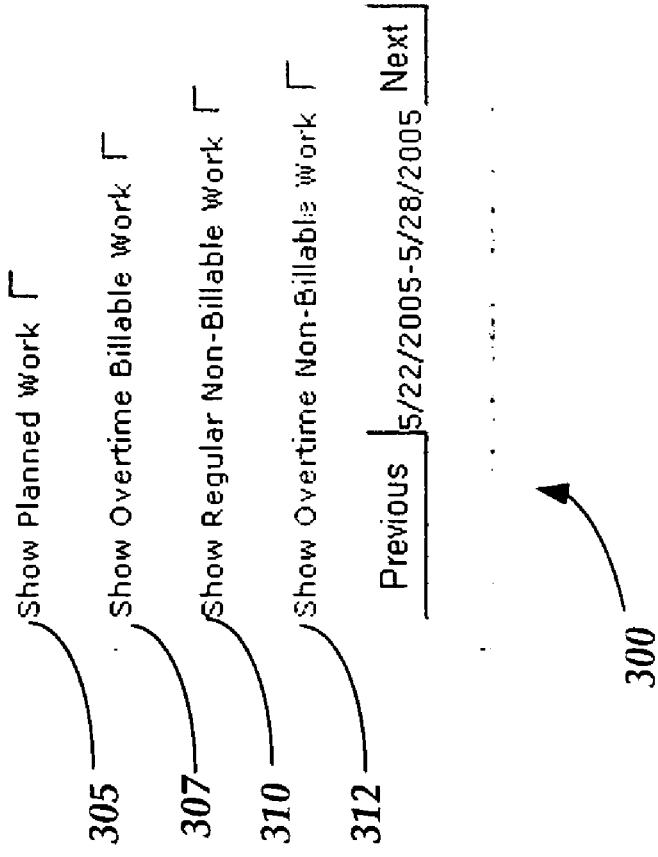
FIG. 3 illustrates a common control UI for selection whether to turn a billing type on or off.
Figure 4:
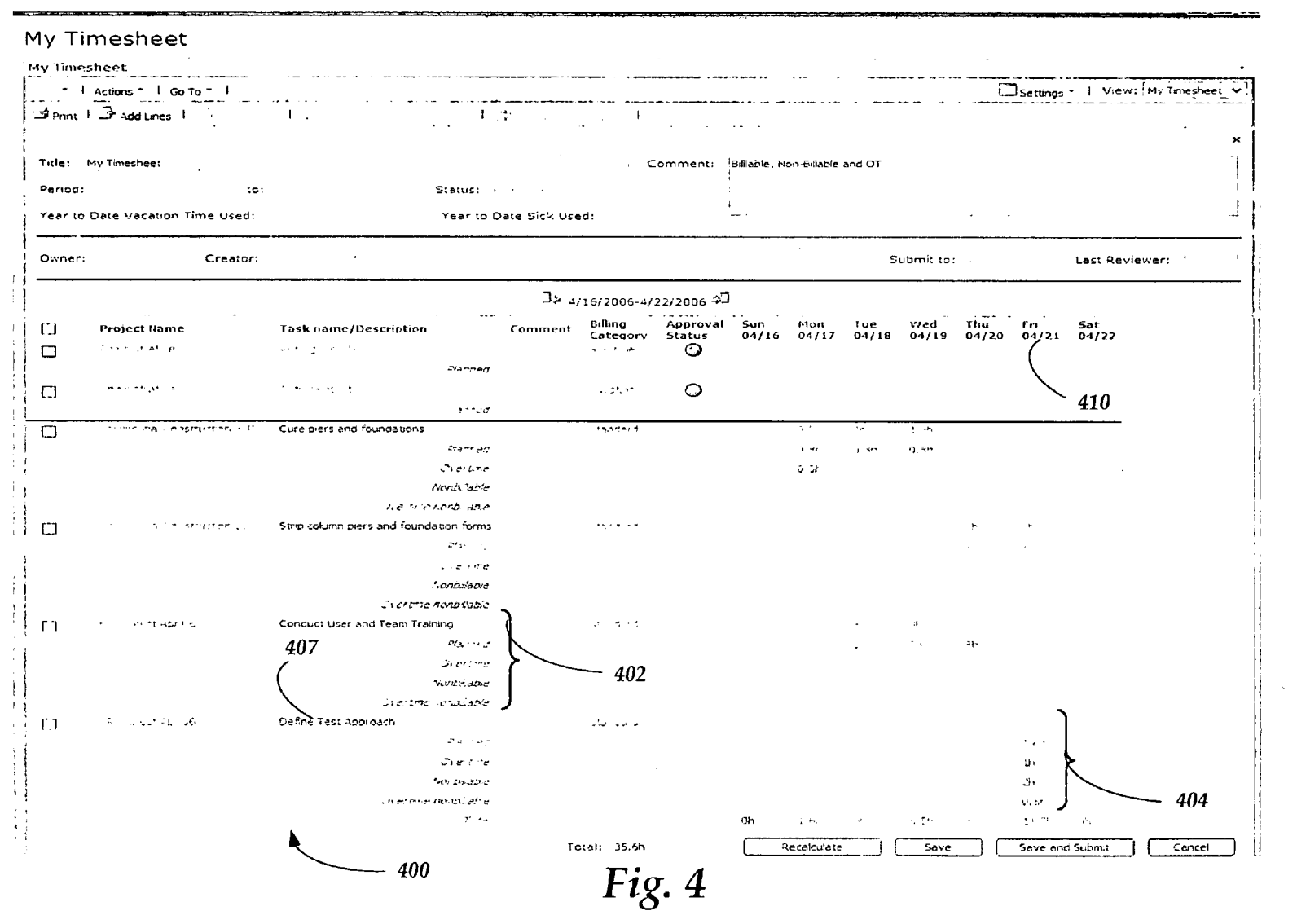

FIG. 3 illustrates a common control UI 300 for selection whether to turn a billing type on or off. The UI 300 includes a checkbox selection 305 for planned work time and a check box selection 307, 310, and 312 for each billing type. A user may access this common control UI 300 via the UI 200 or a UI 400 (FIG. 4). Once the user has made selection while highlighting a task, any timesheet display to that user for that task will include each billing type selected by the user and may also include each billing type containing actual time entry regardless if it is selected or not.

FIG. 4 illustrates another timesheet UI 400 rendering a display of a billing type according to the user selected common controls of FIG. 3. As illustrated in FIG. 4, every billing type 402 and planned work time are accounted for in the UI 400 regardless if an actual time entry is present. As described in detail below, the data entries 404 appearing as separate records, are really all a part of a single record 122 stored on the server 100 associated with the same task 407 and date 410.

Figure 5:
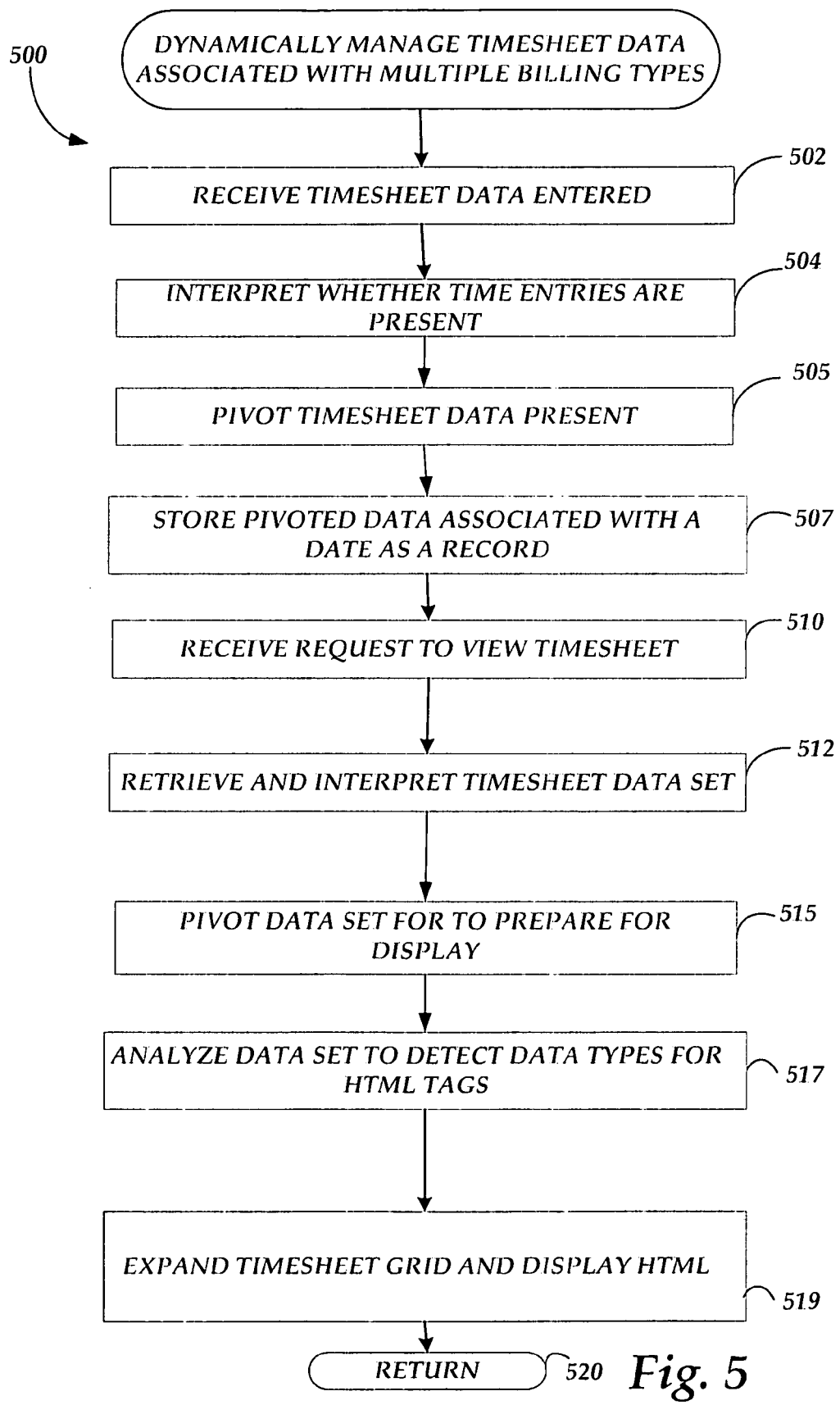
FIG. 5 is an illustrative routine performed in dynamically managing timesheet data associated with multiple billing types.

FIG. 5 is an illustrative routine 500 performed in dynamically managing timesheet data associated with multiple billing types. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 5, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

Referring now to FIGS. 1-5, the logical flow 500 begins at operation 502, where the computing device 100 receives timesheet data entered at a client computer, for instance the computer 121. This data may be received into the client computer via a timesheet grid. A user may enter regular hours and overtime. Once the user saves the data, the server 100 receives the timesheet data as a dataset but in a non-pivoted format. The project server 120 creates the dataset. That dataset is passed through web services back to the server 100.

Next at operation 504, the server interprets the dataset to confirm what time entries are actually present in preparation for pivoting. In some embodiments, there is no need to pivot where there is no data present. For example, if there is no data entered for Wednesday, Wednesday is not be pivoted. Then at operation 505, the server 100 pivots the timesheet data that is present. Next at operation 507 the pivoted data is passed through the project server infrastructure to sequel server database 120 where it is stored as individual records associated with a date and one or more billing types.

At operation 510, when a user requests to view the timesheet data for a specific timesheet, the server 100 receives the request. Then at operation 512 in response to receiving the request, the server 100 retrieves and interprets the timesheet data for actual time entry presence. Next at operation 515, the server 100 pivots the dataset to prepare it for display. It should be appreciated that the client computer 121 may gather HTML such that the dataset will not get to the client. The dataset is simply HTML tagged such as by operation 517 where the server 100 analyzes the dataset to detect data types for HTML tags. The data is analyzed to see what types of data exist on every task to identify what types of rows to display for the user so the user experience can be intelligently compressed.

The data from the dataset is applied to an HTML style the enables the data with those tags to be rendered. The HTML is applied via SOAP protocol as illustrated below with respect to APIs. Thus, the data may remain on the middle tier, the project server 120. Next, at operation 519, the timesheet grid is expanded to account for the data types detected during operation 517 and displayed. The logical flow 500 the returns control to other routines at return operation 520.

APIs illustrating the operations described above with respect to FIG. 5 are described and outlined below:

---

CreateTimesheet

---

Description

Purpose: To create a timesheet object and populate it with
    timesheet line objects.
    Parameters:
        dsDelta: a typed dataset containing necessary information to
        create a typed dataset. Acutally, only Headers table in the
        dataset is used. You just need to fill out TS_UID, TS_NAME,
        TS_COMMENTS, TS_UID, TS_CREATOR_RES_UID, RES_UID and WPRD_UID
        in the Headers.
        preloadType: An enum to indicate if we want to preload
        projects, assignments, adminTime or a cominbation of them.
    Return value: New timesheet UID if successful. Guid.Empty if
    failed.
    Events:
        Creating/Created.

Test

---

The test form is only available for requests from the local machine.
SOAP 1.1

The following is a sample SOAP 1.1 request and response. The placeholders shown need to be
replaced with actual values.
POST /SharedServices1/PSI/timesheet.asmx HTTP/1.1
Host: pserv04
Content-Type: text/xml; charset=utf-8
Content-Length: length
SOAPAction: "http://microsoft.com/ProjectServer/CreateTimesheet"
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
  <soap:Body>
    <CreateTimesheet xmlns="http://microsoft.com/ProjectServer">
      <dsDelta>dataset</dsDelta>
      <preloadType>Default or None or AdminTimes or Projects or -continued Assignments or AdminTimesAndProjects or AdminTimesAndAssignments or
ProjectsAndAssignments or All</preloadType>
    </CreateTimesheet>
  </soap:Body>
</soap:Envelope>
HTTP/1.1 200 OK
Content-Type: text/xml; charset=utf-8
Content-Length: length
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
  <soap:Body>
    <CreateTimesheetResponse xmlns="http://microsoft.com/ProjectServer" />
  </soap:Body>
</soap:Envelope>
SOAP 1.2

The following is a sample SOAP 1.2 request and response. The placeholders shown need to be
replaced with actual values.
POST /SharedServices1/PSI/timesheet.asmx HTTP/1.1
Host: pserv04
Content-Type: application/soap+xml; charset=utf-8
Content-Length: length
<?xml version="1.0" encoding="utf-8"?>
<soap12:Envelope xmlns:xsi="http://www.w3.org/2001/XMLSchema-instance"
xmlns:xsd="http://www.w3.org/2001/XMLSchema"
xmlns:soap12="http://www.w3.org/2003/05/soap-envelope">
  <soap12:Body>
    <CreateTimesheet xmlns="http://microsoft.com/ProjectServer">
      <dsDelta>dataset</dsDelta>
      <preloadType>Default or None or AdminTimes or Projects or
Assignments or AdminTimesAndProjects or AdminTimesAndAssignments or
ProjectsAndAssignments or All</preloadType>
    </CreateTimesheet>
  </soap12:Body>
</soap12:Envelope>
HTTP/1.1 200 OK
Content-Type: application/soap+xml; charset=utf-8
Content-Length: length
<?xml version="1.0" encoding="utf-8"?>
<soap12:Envelope xmlns:xsi="http://www.w3.org/2001/XMLSchema-instance"
xmlns:xsd="http://www.w3.org/2001/XMLSchema"
xmlns:soap12="http://www.w3.org/2003/05/soap-envelope">
  <soap12:Body>
    <CreateTimesheetResponse xmlns="http://microsoft.com/ProjectServer" />
  </soap12:Body>
</soap12:Envelope>
Sample code to create a timesheet
    TimesheetDataSet dsNew = new TimesheetDataSet( );
    TimesheetDataSet.HeadersRow header =
dsNew.Headers.NewHeadersRow( );
    header.TS_UID = Guid.NewGuid( ); //A new guid
    header.TS_NAME = "My timesheet";
    header.TS_COMMENTS = "My comments";
    header.TS_ENTRY_MODE_ENUM =
(byte) PJUtility.GetWebAdminSettings(_webAdminSettingsDS,
PSDBField.WADMIN_TS_DEF_ENTRY_MODE_ENUM);
    header.WPRD_UID = periodUID; //A valid period Guid
    header.RES_UID = ResourceUID;//A valid resource Guid
    header.TS_CREATOR_RES_UID = ResourceUID;//A valid resource
Guid
    dsNew.Headers.AddHeadersRow(header);
    PjContext.PSI.TimeSheetWebService.CreateTimesheet(dsNew,
TimesheetEnum.PreloadType.Default);

PrepareTimesheetLine

Description

Purpose: When a user add a new line to his typed dataset, he only knows
part of the information, like proj_uid,assn_uid. He needs to call this
PSI to do extra jobs. One thing this API does is to validate his
timesheet line information.Then it put extra information which the user
may not know but want to know into the dataset, for example, project
names and assignment name. Finally, it loads actuals into the dataset.
    Parameters:
      tsUID: timesheet UID
      dsDelta: the typed dataset need to be processed.
      tlNeedFill: An array of timesheet line UIDs which need to -continued fill actuals with.

Test

The test form is only available for requests from the local machine.
SOAP 1.1

The following is a sample SOAP 1.1 request and response.
The placeholders shown need to be replaced with actual values.
POST /SharedServices1/PSI/timesheet.asmx HTTP/1.1
Host: pserv04
Content-Type: text/xml; charset=utf-8
Content-Length: length
SOAPAction: "http://microsoft.com/ProjectServer/PrepareTimesheetLine"
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
   <soap:Body>
    <PrepareTimesheetLine xmlns="http://microsoft.com/ProjectServer">
     <tsUID>guid</tsUID>
     <dsDelta>dataset</dsDelta>
     <tlsNeedFill>
       <guid>guid</guid>
       <guid>guid</guid>
     </tlsNeedFill>
    </PrepareTimesheetLine>
   </soap:Body>
</soap:Envelope>
HTTP/1.1 200 OK
Content-Type: text/xml; charset=utf-8
Content-Length: length
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
   <soap:Body>
    <PrepareTimesheetLineResponse
xmlns="http://microsoft.com/ProjectServer">
     <dsDelta>dataset</dsDelta>
    </PrepareTimesheetLineResponse>
   </soap:Body>
</soap:Envelope>
SOAP 1.2

The following is a sample SOAP 1.2 request and response.
The placeholders shown need to be replaced with actual values.
POST /SharedServices1/PSI/timesheet.asmx HTTP/1.1
Host: pserv04
Content-Type: application/soap+xml; charset=utf-8
Content-Length: length
<?xml version="1.0" encoding="utf-8"?>
<soap12:Envelope xmlns:xsi="http://www.w3.org/2001/XMLSchema-instance"
xmlns:xsd="http://www.w3.org/2001/XMLSchema"
xmlns:soap12="http://www.w3.org/2003/05/soap-envelope">
   <soap12:Body>
    <PrepareTimesheetLine xmlns="http://microsoft.com/ProjectServer">
     <tsUID>guid</tsUID>
     <dsDelta>dataset</dsDelta>
     <tlsNeedFill>
       <guid>guid</guid>
       <guid>guid</guid>
     </tlsNeedFill>
    </PrepareTimesheetLine>
   </soap12:Body>
</soap12:Envelope>
HTTP/1.1 200 OK
Content-Type: application/soap+xml; charset=utf-8
Content-Length: length
<?xml version="1.0" encoding="utf-8"?>
<soap12:Envelope xmlns:xsi="http://www.w3.org/2001/XMLSchema-instance"
xmlns:xsd="http://www.w3.org/2001/XMLSchema"
xmlns:soap12="http://www.w3.org/2003/05/soap-envelope">
   <soap12:Body>
    <PrepareTimesheetLineResponse
xmlns="http://microsoft.com/ProjectServer">
     <dsDelta>dataset</dsDelta>
    </PrepareTimesheetLineResponse>
   </soap12:Body>
</soap12:Envelope>

-continued

| ReadTimesheet |
|---|

Description

Purpose: When a user has created a timesheet and at a later time whishes
to revisit the timesheet, this method will return all data that is the
timesheet to the user.
Parameters:
    TSUID: The GUID of the timesheet which will be read.
Test The test form is only available for requests from the local machine.
SOAP 1.1

The following is a sample SOAP 1.1 request and response.
The placeholders shown need to be replaced with actual values.
POST /SharedServices1/PSI/timesheet.asmx HTTP/1.1
Host: pserv04
Content-Type: text/xml; charset=utf-8
Content-Length: length
SOAPAction: "http://microsoft.com/ProjectServer/ReadTimesheet"
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
  <soap:Body>
    <ReadTimesheet xmlns="http://microsoft.com/ProjectServer">
      <tsUID>guid</tsUID>
    </ReadTimesheet>
  </soap:Body>
</soap:Envelope>
HTTP/1.1 200 OK
Content-Type: text/xml; charset=utf-8
Content-Length: length
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
  <soap:Body>
    <ReadTimesheetResponse xmlns="http://microsoft.com/ProjectServer">
      <ReadTimesheetResult>dataset</ReadTimesheetResult>
    </ReadTimesheetResponse>
  </soap:Body>
</soap:Envelope>
SOAP 1.2

The following is a sample SOAP 1.2 request and response.
The placeholders shown need to be replaced with actual values.
POST /SharedServices1/PSI/timesheet.asmx HTTP/1.1
Host: pserv04
Content-Type: application/soap+xml; charset=utf-8
Content-Length: length
<?xml version="1.0" encoding="utf-8"?>
<soap12:Envelope xmlns:xsi="http://www.w3.org/2001/XMLSchema-instance"
xmlns:xsd="http://www.w3.org/2001/XMLSchema"
xmlns:soap12="http://www.w3.org/2003/05/soap-envelope">
  <soap12:Body>
    <ReadTimesheet xmlns="http://microsoft.com/ProjectServer">
      <tsUID>guid</tsUID>
    </ReadTimesheet>
  </soap12:Body>
</soap12:Envelope>
HTTP/1.1 200 OK
Content-Type: application/soap+xml; charset=utf-8
Content-Length: length
<?xml version="1.0" encoding="utf-8"?>
<soap12:Envelope xmlns:xsi="http://www.w3.org/2001/XMLSchema-instance"
xmlns:xsd="http://www.w3.org/2001/XMLSchema"
xmlns:soap12="http://www.w3.org/2003/05/soap-envelope">

-continued

```
  <soap12:Body>
    <ReadTimesheetResponse xmlns="http://microsoft.com/ProjectServer">
      <ReadTimesheetResult>dataset</ReadTimesheetResult>
    </ReadTimesheetResponse>
  </soap12:Body>
</soap12:Envelope>
```

QueueUpdateTimesheet

Description

Purpose: To update a timesheet's header, line or actuals. Deleting/Adding a timesheet line is also done through this API. Basically, you make all the modification to the typed dataset, then call this method to update the timesheet.

Parameters:
- resUID: resource who saves the timesheet. It could be owner, surrogator, approver or adjuster.
- tsUID: timesheet UID
- dsDelta: Dataset delta.

Test

The test form is only available for requests from the local machine.

SOAP 1.1

The following is a sample SOAP 1.1 request and response.
The placeholders shown need to be replaced with actual values.

```
POST /SharedServices1/PSI/timesheet.asmx HTTP/1.1
Host: pserv04
Content-Type: text/xml; charset=utf-8
Content-Length: length
SOAPAction: "http://microsoft.com/ProjectServer/QueueUpdateTimesheet"
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
  <soap:Body>
    <QueueUpdateTimesheet xmlns="http://microsoft.com/ProjectServer">
      <jobUID>guid</jobUID>
      <tsUID>guid</tsUID>
      <dsDelta>dataset</dsDelta>
    </QueueUpdateTimesheet>
  </soap:Body>
</soap:Envelope>
HTTP/1.1 200 OK
Content-Type: text/xml; charset=utf-8
Content-Length: length
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
  <soap:Body>
    <QueueUpdateTimesheetResponse
xmlns="http://microsoft.com/ProjectServer" />
  </soap:Body>
</soap:Envelope>
```

SOAP 1.2

The following is a sample SOAP 1.2 request and response.
The placeholders shown need to be replaced with actual values.

```
POST /SharedServices1/PSI/timesheet.asmx HTTP/1.1
Host: pserv04
Content-Type: application/soap+xml; charset=utf-8
Content-Length: length
<?xml version="1.0" encoding="utf-8"?>
<soap12:Envelope xmlns:xsi="http://www.w3.org/2001/XMLSchema-instance"
xmlns:xsd="http://www.w3.org/2001/XMLSchema"
xmlns:soap12="http://www.w3.org/2003/05/soap-envelope">
  <soap12:Body>
    <QueueUpdateTimesheet xmlns="http://microsoft.com/ProjectServer">
      <jobUID>guid</jobUID>
      <tsUID>guid</tsUID>
      <dsDelta>dataset</dsDelta>
    </QueueUpdateTimesheet>
  </soap12:Body>
</soap12:Envelope>
HTTP/1.1 200 OK
Content-Type: application/soap+xml; charset=utf-8
Content-Length: length
<?xml version="1.0" encoding="utf-8"?>
```

-continued

```
<soap12:Envelope xmlns:xsi="http://www.w3.org/2001/XMLSchema-instance"
xmlns:xsd="http://www.w3.org/2001/XMLSchema"
xmlns:soap12="http://www.w3.org/2003/05/soap-envelope">
   <soap12:Body>
     <QueueUpdateTimesheetResponse
xmlns="http://microsoft.com/ProjectServer" />
   </soap12:Body>
</soap12:Envelope>
```

TimeSheetReadTimesheetDaysOff

SOAP 1.1

The following is a sample SOAP 1.1 request and response. The placeholders shown need to be replaced with actual values.
POST /DefaultSSP_DevInstall/PSI/pwa.asmx HTTP/1.1
Host: xfu5150
Content-Type: text/xml; charset=utf-8
Content-Length: length
SOAPAction:
"http://schemas.microsoft.com/office/project/server/webservices/PWA/TimeSheet
ReadTimesheetDaysOff"

```
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
   <soap:Body>
     <TimeSheetReadTimesheetDaysOff
xmlns="http://schemas.microsoft.com/office/project/server/webservices/PWA /">
       <resUID>guid</resUID>
       <start>dateTime</start>
       <finish>dateTime</finish>
     </TimeSheetReadTimesheetDaysOff>
   </soap:Body>
</soap:Envelope>
```

HTTP/1.1 200 OK
Content-Type: text/xml; charset=utf-8
Content-Length: length

```
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
   <soap:Body>
     <TimeSheetReadTimesheetDaysOffResponse
xmlns="http://schemas.microsoft.com/office/project/server/webservices/PWA /">
<TimeSheetReadTimesheetDaysOffResult>dataset</TimeSheetReadTimesheetDaysOff
Result>
     </TimeSheetReadTimesheetDaysOffResponse>
   </soap:Body>
</soap:Envelope>
```

SOAP 1.2

The following is a sample SOAP 1.2 request and response. The placeholders shown need to be replaced with actual values.
POST /DefaultSSP_DevInstall/PSI/pwa.asmx HTTP/1.1
Host: xfu5150
Content-Type: application/soap+xml; charset=utf-8
Content-Length: length

```
<?xml version="1.0" encoding="utf-8"?>
<soap12:Envelope xmlns:xsi="http://www.w3.org/2001/XMLSchema-instance"
xmlns:xsd="http://www.w3.org/2001/XMLSchema"
xmlns:soap12="http://www.w3.org/2003/05/soap-envelope">
   <soap12:Body>
     <TimeSheetReadTimesheetDaysOff
xmlns="http://schemas.microsoft.com/office/project/server/webservices/PWA /">
       <resUID>guid</resUID>
       <start>dateTime</start>
       <finish>dateTime</finish>
     </TimeSheetReadTimesheetDaysOff>
   </soap12:Body>
</soap12:Envelope>
```

HTTP/1.1 200 OK
Content-Type: application/soap+xml; charset=utf-8
Content-Length: length

```
<?xml version="1.0" encoding="utf-8"?>
<soap12:Envelope xmlns:xsi="http://www.w3.org/2001/XMLSchema-instance"
```

-continued

```
xmlns:xsd="http://www.w3.org/2001/XMLSchema"
xmlns:soap12="http://www.w3.org/2003/05/soap-envelope">
  <soap12:Body>
    <TimeSheetReadTimesheetDaysOffResponse
xmlns="http://schemas.microsoft.com/office/project/server/webservices/PWA /">
<TimeSheetReadTimesheetDaysOffResult>dataset</TimeSheetReadTimesheetDaysOff
Result>
    </TimeSheetReadTimesheetDaysOffResponse>
  </soap12:Body>
</soap12:Envelope>
```

Thus, the present invention is presently embodied as methods, systems, computer program products or computer readable mediums encoding computer programs for dynamically managing timesheet data associated with multiple billing types.

It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A computer-implemented method for dynamically managing timesheet data associated with multiple billing types, the method comprising:
retrieving, by the computer, timesheet data associated with a specific timesheet, wherein each instance of the timesheet data associated with a date and multiple billing types is stored on a server as a single record; and
pivoting, by the computer, the timesheet data to display as separate records the timesheet data associated with a date and multiple billing types, wherein each billing type displayed is associated with one of the separate records as displayed; and
controlling, by the computer, whether an individual billing type is displayed in association with the timesheet data based on a received user selection that turns individual billing types on or off for a selected project task, wherein the displayed timesheet data also includes the individual billing types containing actual time entries, regardless of whether the individual billing types are turned on or off for the selected project task;
thereby reducing clutter when timesheet data is displayed and improving usability when timesheet data is stored;
receiving a request to view data entries for the specific timesheet, wherein the timesheet data is retrieved in response to receiving the request at the server;
interpreting the timesheet data retrieved to determine what dates are stored in association with actual time entries within the timesheet data, wherein pivoting the timesheet data comprises pivoting timesheet data interpreted as being associated with the dates stored in association with actual time entries;
analyzing the timesheet data pivoted to detect data types including the multiple billing types; and
applying, via a Simple Object Access Protocol (SOAP) protocol with respect to a plurality of Application Programming Interfaces (APIs), HTML tags to the timesheet data for display based on the data types detected, the plurality of APIs comprising an API for: validating timesheet line information, putting extra information comprising project and assignment names which are unknown to a timesheet user into a dataset and loading actuals into the dataset, the data set derived from the timesheet data entered via a client computer.

2. The method of claim 1, further comprising:
expanding a timesheet grid to display records where actual time entries are present in association with the data types detected.

3. The method of claim 1, further comprising:
capturing on a server timesheet data entered via a client computer;
interpreting the timesheet data captured to determine whether the timesheet data captured comprises actual time entries present in association with a date;
pivoting the timesheet data captured that comprises actual time entries present in association with a date to store on the server as a single record the timesheet data captured and associated with actual time entries and a date; and
storing each actual time entry present and in association with a date as a single record on the server therein improving data usability and storage efficiency;
wherein the single record is associated with multiple billing types.

4. The method of claim 1, wherein the multiple billing types comprise at least two of the following:
regular billable;
overtime billable;
regular non-billable; and
overtime non-billable.

5. The method of claim 2, further comprising displaying as separate records rendered on the timesheet grid, an HTML rendering of the timesheet data associated with a date and multiple billing types actually stored as single records on the server.

6. The method of claim 5, further comprising:
passing the dataset via web services to the server computer wherein pivoting the timesheet data captured comprises configuring the dataset for storage on the server;
wherein displaying an HTML rendering of the timesheet data associated with a date and multiple billing types stored as single records on the server comprises displaying an HTML rendering of the dataset.

7. Computer storage media having control logic stored therein for causing a computer to perform a method for dynamically managing timesheet data associated with a plurality of billing types, the method comprising:
receiving a request to view data entries for a specific timesheet, wherein the timesheet data is retrieved in response to receiving the request at the computer;
retrieving timesheet data associated with the specific timesheet, wherein each instance of the timesheet data associated with a date and at least one of the plurality of billing types is stored as a single record;
pivoting the timesheet data to display, as if a separate record, the timesheet data associated with a date and at least two of the plurality of billing types, wherein each billing type displayed is associated with one of the displayed separate records;

controlling whether an individual billing type is displayed in association with the timesheet data based on a received user selection that turns individual billing types on or off for a selected project task, wherein the displayed timesheet data also includes the individual billing types containing actual time entries, regardless of whether the individual billing types are turned on or off for the selected project task;

receiving a request to view data entries for the specific timesheet, wherein the timesheet data is retrieved in response to receiving the request at a server;

interpreting the timesheet data retrieved to determine what dates are stored in association with actual time entries within the timesheet data, wherein pivoting the timesheet data comprises pivoting timesheet data interpreted as being associated with the dates stored in association with actual time entries;

analyzing the timesheet data pivoted to detect data types including the multiple billing types; and applying, via a Simple Object Access Protocol (SOAP) protocol with respect to a plurality of Application Programming Interfaces (APIs), HTML tags to the timesheet data for display based on the data types detected, the plurality of APIs comprising an API for: validating timesheet line information, putting extra information comprising project and assignment names which are unknown to a timesheet user into a dataset and loading actuals into the dataset.

8. The computer storage media of claim 7, further comprising:
expanding a timesheet grid to display records where actual time entries are present in association with the data types detected.

9. The computer storage media of claim 7, further comprising:
capturing timesheet data entered via a client computer;
interpreting the timesheet data captured to determine whether the timesheet data captured comprises actual time entries present in association with a date;
pivoting the timesheet data captured that comprises actual time entries present in association with a date to store on the computer as a single record the timesheet data captured and associated with actual time entries and a date; and
storing each actual time entry present and in association with a date as a single record therein improving data usability and storage efficiency;
wherein the single record is associated with at least two of the plurality of billing types.

10. The computer storage media of claim 7, wherein the multiple billing types comprise at least two of the following:
regular billable;
overtime billable;
regular non-billable; and
overtime non-billable.

11. The computer storage media of claim 8, further comprising causing the computer to display as if separate records rendered on the timesheet grid, an HTML rendering of the timesheet data associated with a date and associated with the plurality of billing types actually stored as a single record on the computer.

12. The computer storage media of claim 7, further comprising:
receiving the dataset via web services wherein pivoting the timesheet data captured comprises configuring the dataset for storage on the computer;
wherein displaying an HTML rendering of the timesheet data associated with a date and the plurality of billing types stored as single records on the server comprises generating an HTML rendering of the dataset.

13. A computer-implemented system for dynamically managing timesheet data associated with multiple billing types, the system comprising a server computer, the server computer comprising:
a memory for storing executable program code; and
a processor, functionally coupled to the memory, the processor being responsive to computer-executable instructions contained in the program code and operative to:
receive a request to view data entries for a specific timesheet, wherein the timesheet data is retrieved in response to receiving the request at the server computer;
retrieve timesheet data associated with the specific timesheet, wherein each instance of the timesheet data associated with a date and multiple billing types is stored as a single record;
pivot the timesheet data to display, as if a separate record, the timesheet data associated with a date and multiple billing types, wherein each billing type displayed is associated with one of the displayed separate records;
control whether an individual billing type is displayed in association with the timesheet data based on a received user selection that turns individual billing types on or off for a selected project task, wherein the displayed timesheet data also includes the individual billing types containing actual time entries, regardless of whether the individual billing types are turned on or off for the selected project task;
receive a request to view data entries for the specific timesheet, wherein the timesheet data is retrieved in response to receiving the request at the server computer;
interpret the timesheet data retrieved to determine what dates are stored in association with actual time entries within the timesheet data, wherein pivoting the timesheet data comprises pivoting timesheet data interpreted as being associated with the dates stored in association with actual time entries;
analyze the timesheet data pivoted to detect data types including the multiple billing types; and
apply, via a Simple Object Access Protocol (SOAP) protocol with respect to a plurality of Application Programming Interfaces (APIs), HTML tags to the timesheet data for display based on the data types detected, the plurality of APIs comprising an API for: validating timesheet line information, putting extra information comprising project and assignment names which are unknown to a timesheet user into a dataset and loading actuals into the dataset, the data set derived from the timesheet data.

14. The system of claim 13, wherein the processor is further operative to:
expand a timesheet grid to display records where actual time entries are present in association with the data types detected.

15. The system of claim 13, further comprising a client computer, the client computer comprising a memory for storing executable program code, the client computer further comprising a processor, functionally coupled to the memory, the processor being responsive to computer-executable instructions contained in the program code and operative to display as if separate records rendered on the timesheet grid, an HTML rendering of the timesheet data associated with a date and associated with multiple billing types actually stored as a single record on the server computer.

* * * * *